United States Patent
Kim et al.

(10) Patent No.: US 12,349,170 B2
(45) Date of Patent: *Jul. 1, 2025

(54) METHOD AND APPARATUS FOR REPORTING INFORMATION OF FREQUENCY AFFECTED BY INDEVICE COEXISTENCE INTERFERENCE IN WIRELESS COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

This patent is subject to a terminal disclaimer.

(21) Appl. No.: 18/309,274

(22) Filed: Apr. 28, 2023

(65) Prior Publication Data

US 2023/0269761 A1 Aug. 24, 2023

Related U.S. Application Data

(63) Continuation of application No. 17/164,234, filed on Feb. 1, 2021, now Pat. No. 11,678,349.

(30) Foreign Application Priority Data

Jan. 31, 2020 (KR) ........................ 10-2020-0011929

(51) Int. Cl.
*H04L 12/28* (2006.01)
*H04W 72/0453* (2023.01)
(Continued)

(52) U.S. Cl.
CPC ....... *H04W 72/51* (2023.01); *H04W 72/0453* (2013.01)

(58) Field of Classification Search
CPC ............ H04W 24/10; H04W 72/0453; H04W 72/1215; H04W 72/51; H04W 88/06
(Continued)

(56) References Cited

U.S. PATENT DOCUMENTS 9,509,485 B2 * 11/2016 Zhang ................. H04W 72/541
9,832,778 B2 * 11/2017 Behravan .............. H04W 76/27
(Continued)

FOREIGN PATENT DOCUMENTS

CN 103636261 A 3/2014
CN 106060866 A 10/2016
(Continued)

OTHER PUBLICATIONS

VIVO, 'Introduction of NR IDC solution', R2-1914688, 3GPP TSG-RAN2 Meeting #108, Reno, USA, Nov. 8, 2019, sections 5.3.5.9-6.2.2.
(Continued)

*Primary Examiner* — John Pezzlo
(74) *Attorney, Agent, or Firm* — Jefferson IP Law, LLP

(57) ABSTRACT

A method, performed by a user equipment (UE), of providing In-Device Coexistence (IDC) information is provided. The method includes transmitting, to a base station (BS), UE capability information including IDC information reporting capability information; receiving, from the BS, configuration information about IDC information reporting; detecting an occurrence of an IDC problem; and transmitting, to the BS, UE Assistance information including information of a frequency affected by the IDC problem, based on the configuration information, wherein the information of the frequency affected by the IDC problem is indicated in an IDC Assistance field.

8 Claims, 9 Drawing Sheets

(51) Int. Cl.
*H04W 72/51* (2023.01)
*H04J 1/16* (2006.01)

(58) Field of Classification Search
USPC ..................................... 370/252, 329, 430
See application file for complete search history.

(56) References Cited

U.S. PATENT DOCUMENTS

| 11,095,352 | B2* | 8/2021 | Kung | H04B 7/0695 |
|---|---|---|---|---|
| 2013/0336281 | A1* | 12/2013 | Ahn | H04W 72/1215 |
| | | | | 370/330 |
| 2014/0094125 | A1 | 4/2014 | Behravan et al. | |
| 2014/0141824 | A1 | 5/2014 | Kim et al. | |
| 2014/0248877 | A1 | 9/2014 | Lee et al. | |
| 2014/0355471 | A1* | 12/2014 | Lee | H04W 24/08 |
| | | | | 370/252 |
| 2015/0124676 | A1 | 5/2015 | Song et al. | |
| 2015/0296526 | A1 | 10/2015 | Behravan et al. | |
| 2015/0327280 | A1 | 11/2015 | Zhang et al. | |
| 2015/0382257 | A1 | 12/2015 | Jang et al. | |
| 2016/0057672 | A1 | 2/2016 | Park et al. | |
| 2016/0135213 | A1 | 5/2016 | Zhu et al. | |
| 2017/0105219 | A1 | 4/2017 | Sebire | |
| 2018/0227918 | A1* | 8/2018 | Yun | H04W 74/0833 |
| 2020/0322023 | A1 | 10/2020 | Kung et al. | |
| 2021/0029715 | A1 | 1/2021 | Takahashi et al. | |
| 2021/0067299 | A1* | 3/2021 | Wu | H04B 15/00 |
| 2022/0191728 | A1* | 6/2022 | Jiang | H04W 24/10 |
| 2022/0394537 | A1 | 12/2022 | Ahn et al. | |

FOREIGN PATENT DOCUMENTS

| CN | 110234142 A | 9/2019 |
|---|---|---|
| EP | 3 720 226 A1 | 10/2020 |
| KR | 10-2015-0090712 A | 8/2015 |

OTHER PUBLICATIONS

Lenovo et al., 'Miscellaneous corrections', R2-1914715, 3GPP TSG-RAN2 Meeting #108, Reno, USA, Nov. 7, 2019, pp. 47, 60.
Ericsson, 'On explicit NR FR1 related CGI reporting capability indication', R2-1915675, 3GPP TSGRAN2 Meeting #108, Reno, USA, Nov. 7, 2019, pp. 28, 42-43.
International Search Report dated Apr. 14, 2021, issued in International Patent Application No. PCT/KR2021/001134.
Research in Motion UK Limited, Signaling Procedures for IDC operation, R2-121281, 3GPP TSG-RAN WG2 Meeting #77b, Jeju, Korea, Mar. 17, 2012.
VIVO, Discussion on the IDC report of NR frequency in EN-DC, R2-1809876, 3GPP TSG-RAN WG2 NR AH1807 Meeting, Montreal, Canada, Jun. 22, 2018.
VIVO, Offline discussion summary on NR IDC, R2-1909786, 3GPP TSG-RAN WG2 Meeting #107, Prague, Czech Republic, Aug. 16, 2019.
Extended European Search Report dated Jan. 3, 2023, issued in European Patent Application No. 21747144.0.
Chinese Office Action dated Apr. 16, 2025, issued in Chinese Patent Application No. 202180011965.9.
European Office Action dated May 21, 2025, issued in European Patent Application No. 21747144.0.

* cited by examiner

METHOD AND APPARATUS FOR REPORTING INFORMATION OF FREQUENCY AFFECTED BY INDEVICE COEXISTENCE INTERFERENCE IN WIRELESS COMMUNICATION SYSTEM

CROSS-REFERENCE TO RELATED APPLICATION(S)

This application is a continuation application of prior application Ser. No. 17/164,234, filed on Feb. 1, 2021, which is based on and claims priority under 35 U.S.C. § 119(a) of a Korean patent application number 10-2020-0011929, filed on Jan. 31, 2020, in the Korean Intellectual Property Office, the disclosure of which is incorporated by reference herein in its entirety.

BACKGROUND

1. Field

The disclosure relates to a method and apparatus for transmitting and receiving data in a wireless communication system. More particularly, the disclosure relates to a method and apparatus for reporting frequency information.

2. Description of Related Art

To meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-gigahertz (GHz) band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of cloud radio access network (Cloud-RAN) as the above-described big data processing technology may be an example of convergence of 5G communication technology and IoT technology.

As various services can be provided due to the aforementioned technical features and development of mobile communication systems, there is a demand for a method of efficiently reporting information of a frequency affected by an interference between communication modules in a device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for effectively providing a service in a mobile communication system.

Additional aspects will be set forth in part in the description which follows and, in part, will be apparent from the description, or may be learned by practice of the presented embodiments of the disclosure.

In accordance with an aspect of the disclosure, a method, performed by a user equipment (UE), of providing In-Device Coexistence (IDC) information is provided. The method includes transmitting, to a base station (BS), UE capability information including IDC information reporting capability information, receiving, from the BS, configuration information about IDC information reporting, detecting an occurrence of an IDC problem, and transmitting, to the BS, UE Assistance information including information of a frequency affected by the IDC problem, based on the configuration information, wherein the information of the frequency affected by the IDC problem is indicated in an IDC Assistance field.

The IDC Assistance field may include at least one of an affectedCarrierFreqList field indicating the information of the frequency affected by the IDC problem or an affectedCarrierFreqCombList field indicating information of a combination of frequencies affected by the IDC problem when Carrier Aggregation is configured.

The affectedCarrierFreqList field and the affectedCarrierFreqCombList field may indicate, by using Absolute Radio-Frequency Channel Number (ARFCN)-Value NR information or a combination of a plurality of pieces of the ARFCN-Value NR information, a center frequency of a frequency band affected by the IDC problem.

The method may further include: detecting that the frequency does not experience the IDC problem anymore, and transmitting, to the BS, information indicating that the IDC problem is cancelled.

The transmitting of, to the BS, information indicating that the IDC problem is cancelled may include transmitting, to the BS, a message including an IDC Assistance field that does not include IDC information.

In accordance with another aspect of the disclosure, a method, performed by a base station (BS), of receiving In-Device Coexistence (IDC) information is provided. The method includes receiving, from a user equipment (UE), UE capability information including IDC information reporting capability information, transmitting, to the UE, configuration information about IDC information reporting, and receiving, from the UE, UE Assistance information including information of a frequency affected by an IDC problem, wherein the information of the frequency affected by the IDC problem is indicated in an IDC Assistance field.

The IDC Assistance field may include at least one of an affectedCarrierFreqList field indicating the information of the frequency affected by the IDC problem or an affectedCarrierFreqCombList field indicating information of a combination of frequencies affected by the IDC problem when Carrier Aggregation is configured.

The affectedCarrierFreqList field and the affectedCarrierFreqCombList field may indicate, by using Absolute Radio-Frequency Channel Number (ARFCN)-Value NR information or a combination of a plurality of pieces of the ARFCN-Value NR information, a center frequency of a frequency band affected by the IDC problem.

The method may further include receiving, from the UE, information indicating that the IDC problem is cancelled.

The receiving of, from the UE, the information indicating that the IDC problem is cancelled may include receiving, from the UE, a message including an IDC Assistance field that does not include IDC information.

In accordance with another aspect of the disclosure, a user equipment (UE) for providing In-Device Coexistence (IDC) information is provided. The method includes a transceiver, and a processor combined with the transceiver and configured to transmit, to a base station (BS), UE capability information including IDC information reporting capability information, receive, from the BS, configuration information about IDC information reporting, detect an occurrence of an IDC problem, and transmit, to the BS, UE Assistance information including information of a frequency affected by the IDC problem, based on the configuration information, wherein the information of the frequency affected by the IDC problem is indicated in an IDC Assistance field.

The IDC Assistance field may include at least one of an affectedCarrierFreqList field indicating the information of the frequency affected by the IDC problem or an affectedCarrierFreqCombList field indicating information of a combination of frequencies affected by the IDC problem when Carrier Aggregation is configured.

The affectedCarrierFreqList field and the affectedCarrierFreqCombList field may indicate, by using Absolute Radio-Frequency Channel Number (ARFCN)-Value NR information or a combination of a plurality of pieces of the ARFCN-Value NR information, a center frequency of a frequency band affected by the IDC problem.

The processor may be further configured to detect that the frequency does not experience the IDC problem anymore, and transmit, to the BS, information indicating that the IDC problem is cancelled.

The processor may be further configured to transmit, to the BS, a message including an IDC Assistance field that does not include IDC information.

In accordance with another aspect of the disclosure, a base station (BS) for receiving In-Device Coexistence (IDC) information is provided. The method includes a transceiver, and a processor combined with the transceiver and configured to receive, from a user equipment (UE), UE capability information including IDC information reporting capability information, transmit, to the UE, configuration information about IDC information reporting, and receive, from the UE, UE Assistance information including information of a frequency affected by an IDC problem, wherein the information of the frequency affected by the IDC problem is indicated in an IDC Assistance field.

The IDC Assistance field may include at least one of an affectedCarrierFreqList field indicating the information of the frequency affected by the IDC problem or an affectedCarrierFreqCombList field indicating information of a combination of frequencies affected by the IDC problem when Carrier Aggregation is configured.

The affectedCarrierFreqList field and the affectedCarrierFreqCombList field may indicate, by using Absolute Radio-Frequency Channel Number (ARFCN)-Value NR information or a combination of a plurality of pieces of the ARFCN-Value NR information, a center frequency of a frequency band affected by the IDC problem.

The processor may be further configured to receive, from the UE, information indicating that the IDC problem is cancelled.

The processor may be further configured to receive, from the UE, a message including an IDC Assistance field that does not include IDC information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
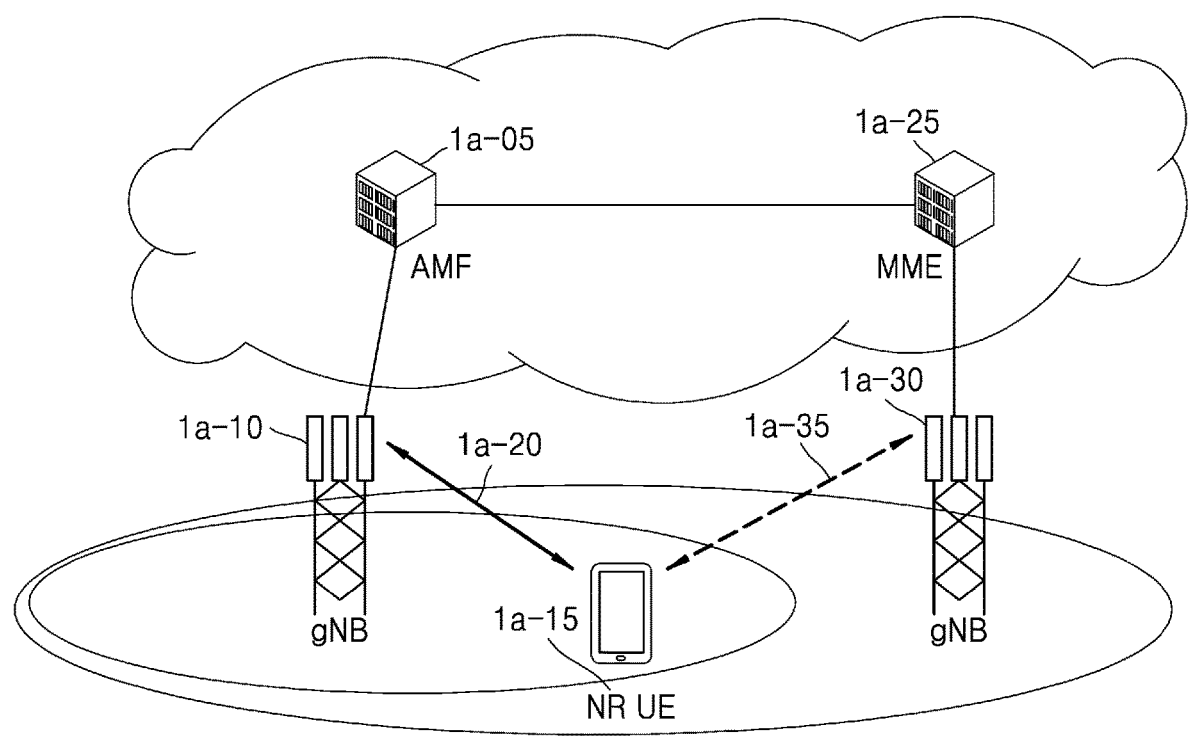
FIG. 1A is a diagram illustrating architecture of a next-generation mobile communication system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words in the following descriptions are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or part of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments of the disclosure.

In the following descriptions of the disclosure, well-known functions or configurations are not described in detail because they would obscure the disclosure with unnecessary details. Hereinafter, embodiments of the disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the disclosure is not limited to terms to be described below, and other terms indicating objects having equal technical meanings may be used.

For convenience of descriptions, the disclosure uses terms and names defined in the $3^{rd}$ Generation Partnership Project (3GPP) long term evolution (LTE) standards. However, the disclosure is not limited to the terms and names, and may be equally applied to communication systems conforming to other standards. In the disclosure, an evolved node B (eNB) may be interchangeably used with a next-generation node B (gNB) for convenience of descriptions. That is, a BS described by an eNB may represent a gNB. Also, the term "terminals" may refer to not only mobile phones, narrowband Internet of Things (NB-IoT) devices, and sensors but also refer to other wireless communication devices.

In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network The term "terminal" may be used interchangeably with a user equipment (UE), a mobile station (MS), a cellular phone, a smartphone, a computer, or a multimedia system capable of performing communication functions. However, the disclosure is not limited to the aforementioned examples.

In particular, the disclosure may be applied to 3GPP New Radio (NR) (5G mobile communication standard). The disclosure is applicable to intelligent services (e.g., smart home, smart building, smart city, smart car or connected car, health care, digital education, retail, security, and safety services) based on 5G communication technology and Internet of things (IoT) technology. In the disclosure, an eNB may be interchangeably used with a gNB for convenience of explanation. That is, a BS described by an eNB may represent a gNB. In the disclosure, the term "terminals" may refer to not only mobile phones, narrowband IoT (NB-IoT) devices, and sensors but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-Advanced (LTE-A), and LTE-Pro of the 3GPP, high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an UL. The UL refers to a radio link through which a UE (also referred to as a mobile station (MS)) transmits data or a control signal to a BS (e.g., eNB), and the DL refers to a radio link through which a BS transmits data or a control signal to a UE. The above-described multi-connection scheme identifies data or control information of different users by allocating time-frequency resources for carrying the data or control information of the users not to overlap each other, i.e., to achieve orthogonality therebetween.

Post-LTE systems, that is, 5G systems need to simultaneously support services capable of reflecting and satisfying various requirements of users, service providers, etc. Services considered for the 5G systems include enhanced mobile broadband (eMBB), massive machine-type communication (mMTC), ultra-reliability low-latency communication (URLLC) services or the like.

According to some embodiments of the disclosure, the eMBB service may be aimed to provide a more enhanced data rate compared to a data rate supported by LTE, LTE-A, or LTE-Pro. For example, the eMBB service in the 5G communication systems need to provide a peak data rate of 20 gigabits per second (Gbps) for a DL and provide a peak data rate of 10 Gbps for a UL in view of a single base station. At the same time, the 5G communication systems may simultaneously provide a maximum data rate and provide an increased user perceived data rate. To satisfy these requirements, the 5G communication systems may require various enhanced transmission/reception technologies including enhanced multiple-input and multiple-output (MIMO). The data rate required for the 5G communication systems may be satisfied by using a frequency bandwidth wider than 20 megahertz (MHz) in a frequency band of 3 to 6 GHz or over 6 GHz compared to LTE systems currently using a transmission bandwidth of up to 20 MHz in a 2 GHz band.

At the same time, the mMTC service is considered for the 5G communication systems to support application services such as IoT. The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/km$^2$. In addition, because UEs supporting mMTC may be located in a shadow zone, e.g., a basement of a building, due to service characteristics, the mMTC service may require a wider coverage compared to other services provided by the 5G communication systems. The UEs supporting mMTC need to be low-priced, and are not able to frequently replace batteries and thus require a very long battery life time, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, etc. Thus, URLLC communication may have to provide a very low latency (e.g., ultra-low latency) and a very high reliability (e.g., ultra-reliability). For example, the URLLC service needs to satisfy an air interface latency smaller than 0.5 millisecond (ms) and, at the same time, may require a packet error rate equal to or smaller than $10^{-5}$. Therefore, for the URLLC service, the 5G communication systems need to provide a smaller transmit time interval (TTI) compared to other services and, at the same time, may be required to broadly allocate resources in a frequency band to ensure reliability of a communication link.

The above-described three services considered for the 5G communication systems, i.e., the eMBB, URLLC, and mMTC services, may be multiplexed and provided by a single system. In this case, the services may use different transmission/reception schemes and different transmission/reception parameters to satisfy different requirements for the services. The above-described mMTC, URLLC, and eMBB services are merely examples and the types of services to which the disclosure is applicable are not limited thereto.

Although LTE, LTE-A, LTE Pro, or 5G (or NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

FIG. 1A is a diagram illustrating architecture of a next-generation mobile communication system, according to an embodiment of the disclosure.

Referring to FIG. 1A, a gNB 1a-10 corresponds to an eNB of a legacy LTE system. The gNB 1a-10 may be connected to a NR UE 1a-15 via a radio channel and may provide superior services compared to an existing node B (1a-20). All user traffic data may be serviced via shared channels in the next-generation mobile communication system, and thus, an entity for collecting buffer status information of UEs, available transmission power status information, and channel state information and performing scheduling may be required and the gNB 1a-10 may operate as such an entity. One gNB may generally control a plurality of cells. The next-generation mobile communication system may have a bandwidth greater than the maximum bandwidth of the legacy LTE system so as to achieve an ultra-high data rate, compared to the legacy LTE system, and may use a beamforming technology with the use of OFDM as a radio access technology.

Also, according to some embodiments of the disclosure, a NR gNB may apply adaptive modulation & coding (AMC) to determine a modulation scheme and a channel coding rate in accordance with a channel state of a UE.

Also, according to some embodiments of the disclosure, an AMF 1a-05 may perform functions such as mobility support, bearer configuration, quality of service (QoS) configuration, and the like. The AMF 1a-05 is an entity for performing a mobility management function and various control functions on the NR UE 1a-15 and may be connected to a plurality of base stations. The next-generation mobile communication system may cooperate with the legacy LTE system, and the AMF 1a-05 is connected to a Mobility Management Entity (MME) 1a-25 through a network interface. The MME 1a-25 may be connected to an eNB 1a-30 that is a legacy BS. The NR UE 1a-15 configured to support LTE-NR Dual Connectivity may be transmit or receive data by maintaining connection not only to the gNB 1a-10 but also to the eNB 1a-30 via connection 1a-35.

Figure 1B:
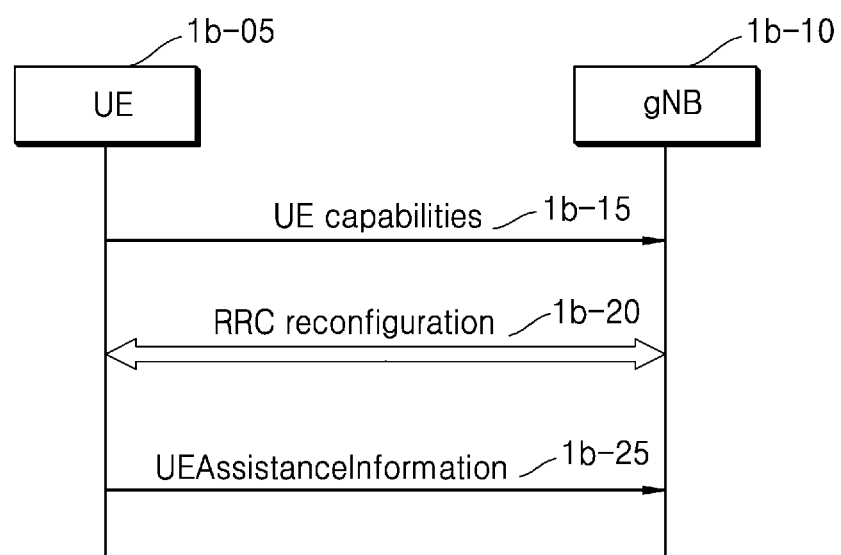
FIG. 1B is a flowchart of a process in which a user equipment (UE) reports, to a next-generation node B (gNB), preset information for reporting preferred items of the UE in a mobile communication system, according to an embodiment of the disclosure.

FIG. 1B is a flowchart of a process in which a UE reports, to a gNB, preset information for reporting preferred items of the UE in a mobile communication system, according to an embodiment of the disclosure.

Referring to FIG. 1B, in LTE and NR mobile communication systems, the UE may report its preferred items compared to current configuration to the BS. For example, in the LTE, the UE may report preferred items as below. However, the disclosure is not limited to the example below.

Preferred power consumption decrease (UE power preference)
Preferred UL/DL bandwidth (BW) (BW preference)
Preferred delay budget
Preferred Semi-Persistent Scheduling (SPS) configuration
Preferred overheating assistance When the BS receives the report, the BS may trigger reconfiguration, in response to the report. For example, when the BS receives the report on preferred power consumption decrease, preferred delay budget, and preferred overheating assistance, the BS may perform the reconfiguration by decreasing or increasing a discontinuous reception (DRX) interval. However, the disclosure is not limited the example above.

In the NR, the UE may report, to the BS, preferred delay budget and preferred overheating assistance.

In particular, compared to the LTE, the UE in the NR may specifically report reconfiguration items preferred to decrease overheating. That is, in the LTE, the UE can report or indicate preferred UE category for overheating assistance and a UE-preferred maximum number of SCells, whereas in the NR, the UE can report or indicate a UE-preferred maximum number of SCells, a UE-preferred aggregated frequency BW, and a UE-preferred maximum number of MIMO layers.

According to an embodiment of the disclosure, in a procedure for reporting preferred items, a UE 1b-05 may report its capabilities of reporting respective preferred items to a gNB 1b-10 (operation 1b-15). Based on information of the capabilities of the UE 1b-05, the gNB 1b-10 may configure that the UE 1b-05 can report, to the gNB 1b-10, each of the preferred items at a point of time when it is required (operation 1b-20). The UE 1b-05 may report its preferred item to the gNB 1b-10 when the preferred item is required for implementation (operation 1b-25).

Figure 1C:
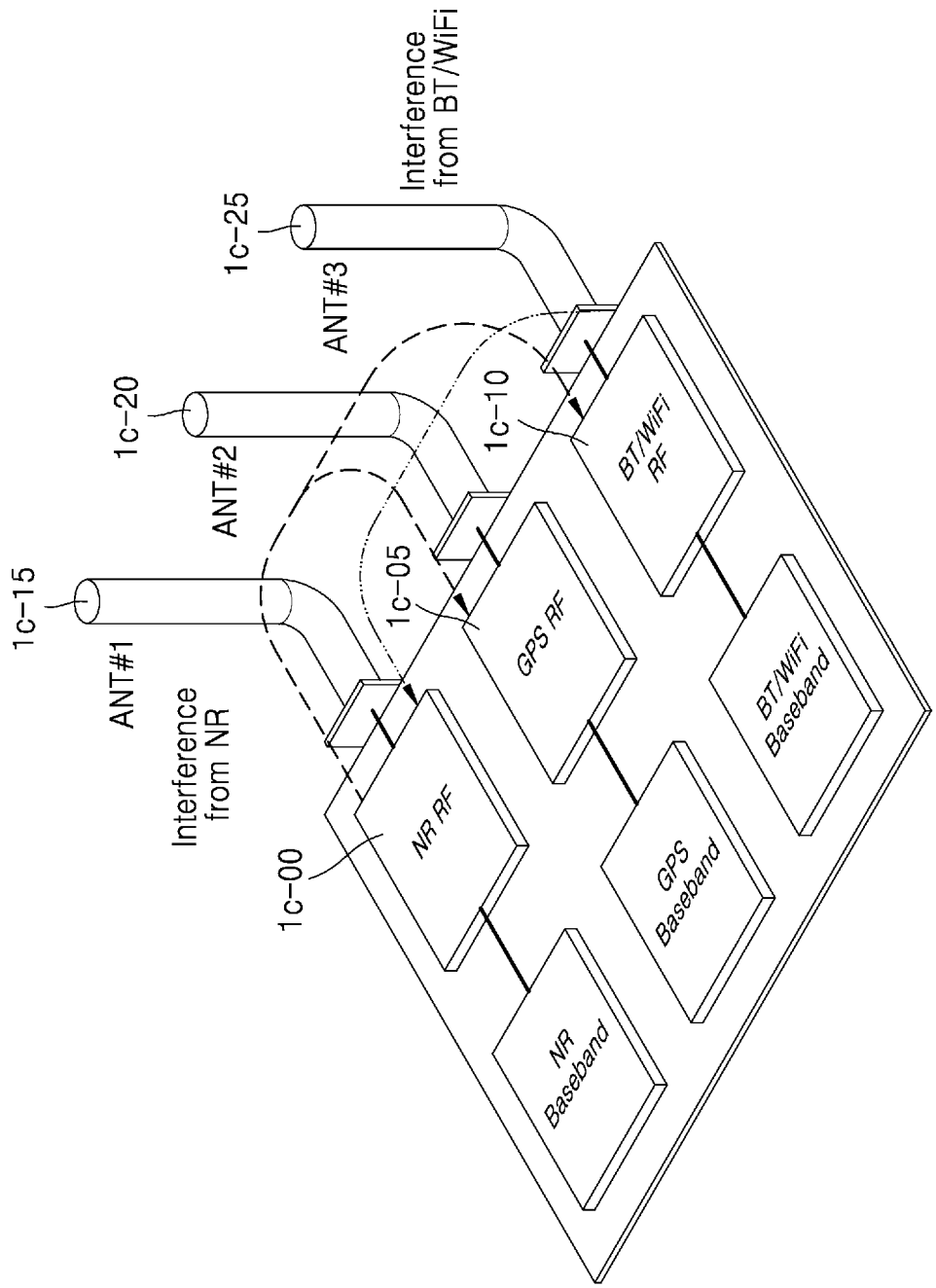
FIG. 1C is a diagram for describing In-Device Coexistence (IDC), according to an embodiment of the disclosure.

FIG. 1C is a diagram for describing In-Device Coexistence (IDC), according to an embodiment of the disclosure.

Referring to FIG. 1C, the IDC interference refers to interference caused by multiple communication modules in a device, thereby affecting the multiple communication modules. An IDC technology or an IDC interference cancellation technology refers to a technology of minimizing interference when multiple communication modules in a device interfere with each other.

Recently, UEs have various functions and multiple communication modules to support the various functions. A UE may have not only an NR communication module 1c-00 but also have a global positioning system (GPS) module 1c-05, a short-range communication module 1c-10 such as Bluetooth and a wireless local area network (wireless LAN), and the like. The aforementioned modules may transmit or receive required data via antennas 1c-15, 1c-20, and 1c-25 respectively connected thereto. Although frequency bands respectively used by communication systems are different, when neighboring bands are used, interference between communication modules may occur. This is because, ideally, signals to be transmitted or received between bands cannot be separated. Moreover, communication modules and antennas respectively connected thereto are positioned in one device, and thus are very adjacent to each other. Accordingly, an intensity of interference affecting each other may be relatively very high. Therefore, in order to reduce the interference, it is necessary to control a transmit power between the communication modules.

For example, when the short-range communication module 1c-10 such as Bluetooth, a WLAN, and the like attempts to receive data in a NR UL, a transmission signal of the NR communication module 1c-00 may cause interference to the short-range communication module 1c-10. In order to decrease the interference, the amount of interference may be controlled by limiting a maximum UL transmit power of the NR communication module 1c-00. Alternatively, an operation of the NR communication module 1c-00 may be temporarily stopped to remove an interference power affecting the short-range communication module 1c-10. On the contrary, the short-range communication module 1c-10 may cause interference to a reception signal of the NR communication module 1c-00 in a NR DL.

Figure 1D:
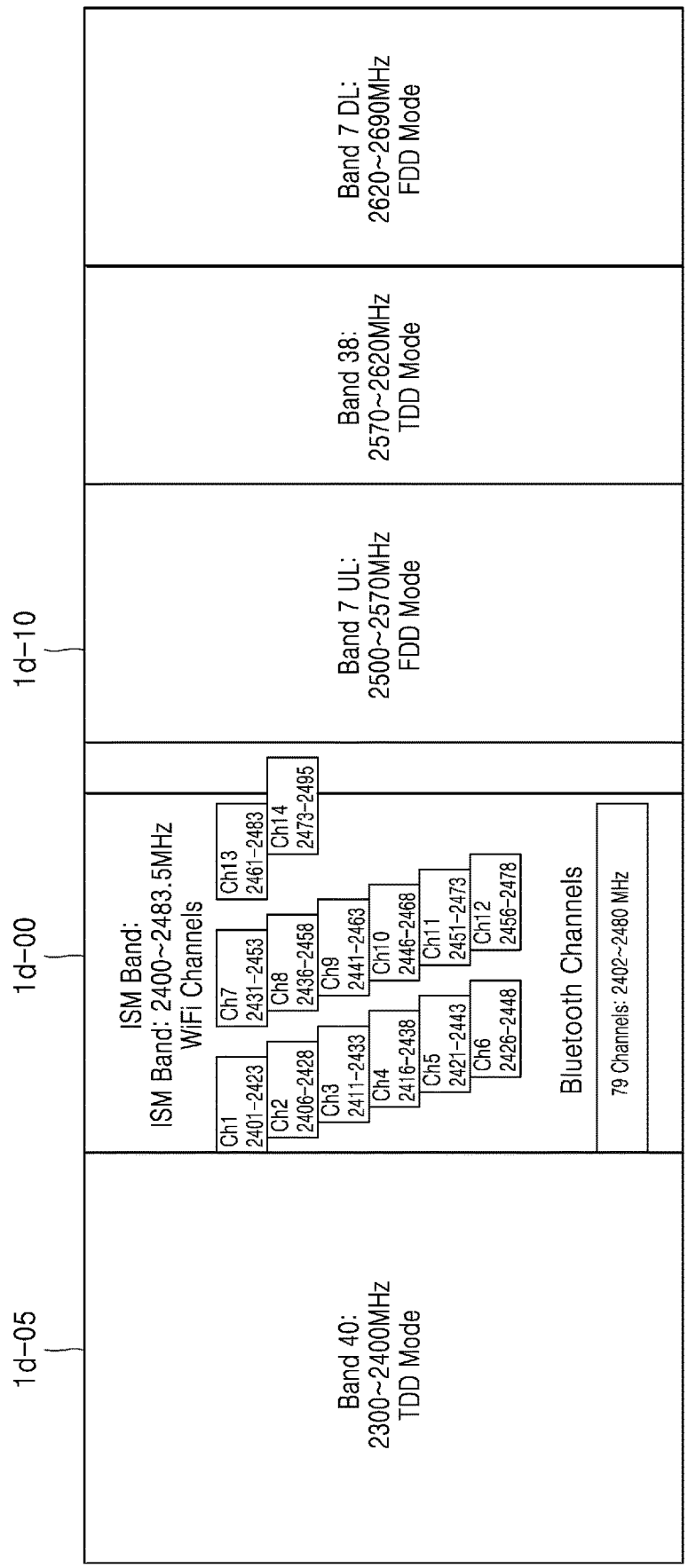
FIG. 1D illustrates neighboring frequency bands of an Industrial Scientific and Medical (ISM) band, from among frequencies of $3^{rd}$ Generation Partnership Project (3GPP) currently used in mobile communications, according to an embodiment of the disclosure.

FIG. 1D illustrates neighboring frequency bands of an Industrial Scientific and Medical (ISM) band, from among frequencies of 3GPP currently used in mobile communications, according to an embodiment of the disclosure.

Referring to FIG. 1D, with neighboring frequency bands of an ISM band 1d-00, it is apparent that, when a mobile communication cell uses Band 40 1d-05 and a WLAN uses channel #1, interference is high, and when a mobile communication cell uses Band 1c-1d-10 and channel #13 or #14 is used as a WLAN channel, interference is high. Therefore, there is a demand for a method of appropriately avoiding interference when the interference occurs.

According to the legacy LTE standard, in order to avoid interference between communication modules in a terminal, a method of decreasing IDC interference between modules by adjusting DRX configuration information according to a Time Division Multiplexing (TDM) scheme has been studied.

Figure 1E:
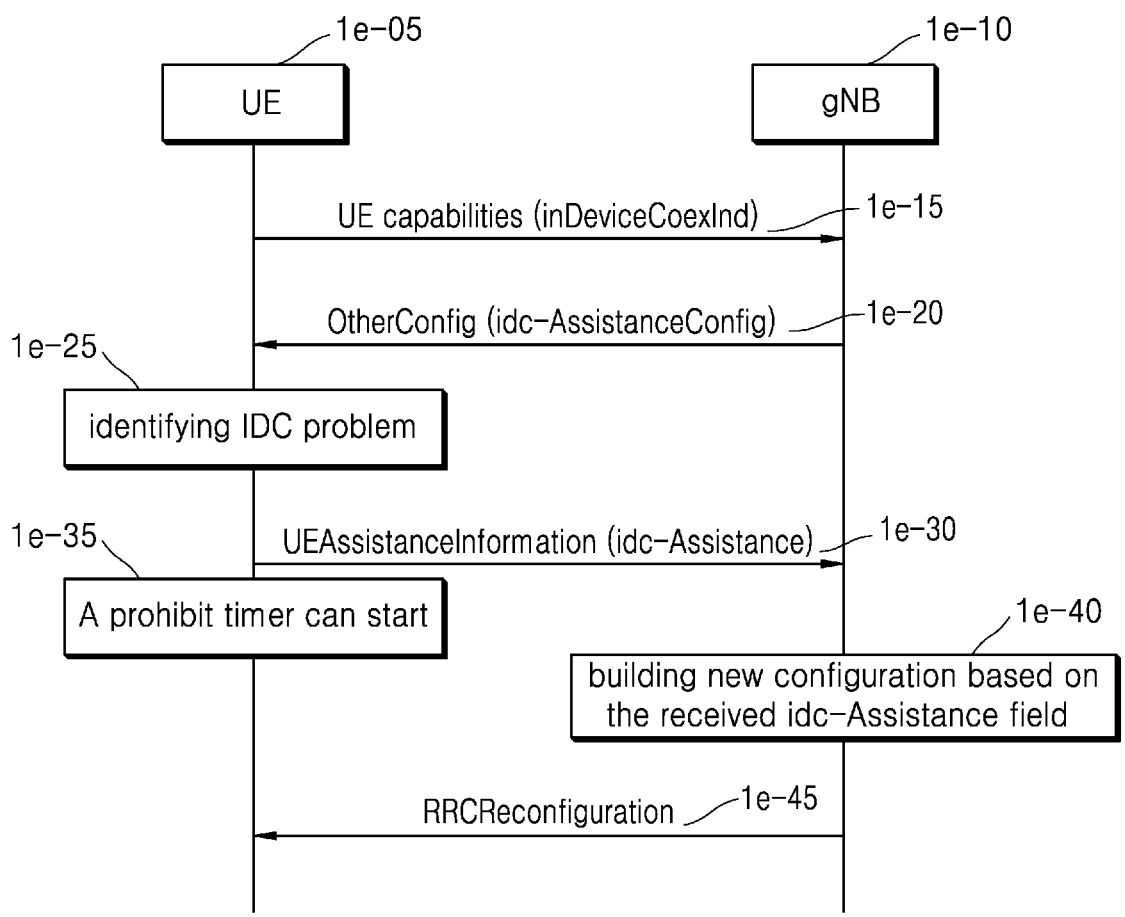
FIG. 1E is a flowchart of a procedure of reporting preset IDC information to a base station (BS) in a wireless communication system, according to an embodiment of the disclosure.

FIG. 1E is a flowchart of a procedure of reporting preset IDC information to a BS in a wireless communication system, according to an embodiment of the disclosure.

Referring to FIG. 1E, a UE 1e-05 may report, to a gNB 1e-10, that the UE 1e-05 has a capability of reporting IDC information (operation 1e-15). According to an embodiment of the disclosure, the IDC information may include information about IDC interference or information about an IDC interference cancellation technology. However, the disclosure is not limited thereto and may include all types of IDC-related information. In this regard, the UE 1e-05 may report, to the gNB 1e-10, an indicator indicating the capability of reporting IDC information. The UE 1e-05 may distinguish between an indicator indicating a capability of reporting a problem when a frequency of FR1 has an IDC problem (e.g., an IDC interference problem) and an indicator indicating a capability of reporting a problem when a frequency of FR2 has an IDC problem, and may report the indicators to the gNB 1e-10.

The gNB 1e-10 configures, via a preset indicator to the UE 1e-05 by using idc-AssistanceConfig that is a preset information element (IE), that the UE 1e-05 can report preset IDC information to the gNB 1e-10 in operation 1e-20. The idc-AssistanceConfig IE may include an indicator for configuring that the UE 1e-05 can report occurrence of an IDC problem due to Inter-Modulation Distortion by a NR frequency when UL Carrier Aggregation is configured. The idc-AssistanceConfig IE includes a frequency list for which reporting is available from among NR frequencies having an IDC problem. In the disclosure, the frequency list for which reporting is available from among the NR frequencies having an IDC problem is included in CandidateServingFreqList IE, and each of frequencies included in the frequency list for which reporting is available is indicated by Absolute Radio-Frequency Channel Number (ARFCN)-ValueNR IE indicating one center frequency. Even when the UE 1e-05 has an IDC problem, the UE 1e-05 may not report a frequency that does not belong to a list in CandidateServingFreqList.

When the CandidateServingFreqList IE is not provided, the UE 1e-05 reports, to the gNB 1e-10, information of a frequency having an IDC problem from among NR frequencies supported by the UE 1e-05. The CandidateServingFreqList IE may include a value of one prohibit timer that is inDeviceCoexIndicationProhibitTimer. When the UE 1e-05 identifies the IDC problem (operation 1e-25) and reports preset IDC information (operation 1e-30), a timer 1e-35 starts, and while the timer 1e-35 is running, the UE 1e-05 cannot report the IDC information. This is to prevent occurrence of significant signaling overhead due to excessive triggering of an IDC information report.

According to another embodiment of the disclosure, because an IDC problem is different from preferred items of the UE 1e-05, when a problem occurs or is changed, it is required to immediately report the problem or the change. Therefore, the timer 1e-35 may be omitted. When the timer 1e-35 corresponding to the IDC information is applied, the timer 1e-35 has a value of 0.

According to an embodiment of the disclosure, the preset IDC information may be included in an idc-Assistance field, and an IE corresponding to the idc-Assistance field may be transmitted in a state of being included in a UEAssistanceInformation message that is one RRC message to the gNB 1e-10 (operation 1e-30). The idc-Assistance field may include two fields. The one field is an affectedCarrierFreqList field that may be used to indicate information of a frequency having an IDC problem. The other field is an affectedCarrierFreqCombList field that may be used to indicate UL Carrier Aggregation combination experiencing an IDC problem and supported by the UE 1e-05.

When the UE 1e-05 experiences an IDC problem (e.g., an IDC interference problem), or a previously-reported IDC problem is changed, methods below are provided to indicate frequency information in the affectedCarrierFreqCombList field.

According to an embodiment of the disclosure, only a frequency for which measurement information is provided from the gNB 1e-10 may be included in affectedCarrierFreqList. When the gNB 1e-10 indicates the UE 1e-05 to measure one frequency, the gNB 1e-10 provides, to the UE 1e-05, MeasObject IE indicating a frequency to be measured, ReportConfigNR IE indicating a method of reporting measured information, and measId indicating a combination of MeasObject and ReportConfigNR. A plurality of MeasObject IEs may be provided, and each MeasObject may be identified by each MeasObjectId that is also provided.

Option 1-1: Center frequency information of a frequency having an IDC problem is indicated by using ARFCN-ValueNR IE. A bandwidth of the frequency having the IDC problem, which is indicated by a center frequency, is previously determined according to a preset rule. For example, the bandwidth is preset in a measConfig field from a network or a pre-fixed value such as 100 MHz is applied thereto. Alternatively, when the center frequency belongs to a frequency band supported by a particular cell, it may be determined that the supported frequency band has an IDC problem.

Option 1-2: Information of a frequency having an IDC problem is indicated by using MeasObjectId IE. MeasObject corresponding to MeasObjectId may include various information about a frequency. For example, MeasObject may include ARFCN-ValueNR that is center frequency information, FreqBandIndicatorNR that is frequency band information of a frequency band to which the frequency belongs, information of a Synchronization Signal Block (SSB) or a channel state information reference signal (CSI-RS) transmitted on the frequency, or the like. MeasObject IE may be configured in a measConfig field. Based on the TS 38.331 standard specification, MeasObjectNR information is as below. However, the TS 38.331 standard specification below is merely an example, and MeasObjectNR (or MeasObject) of the disclosure is not limited to the example below.

Obviously, the disclosure is not limited to the example above, and Option 1-1 and Option 1-2 may be combined together to be performed.

MeasObjectNR
The IE MeasObjectNR specifies information applicable for SS/PBCH block(s) intra/inter-frequency measurements and/or CSI-RS intra/inter-frequency measurements.

MeasObjectNR information element

-- ASN1START
-- TAG-MEASOBJECTNR-START

-continued

```
MeasObjectNR ::=                        SEQUENCE {
    ssbFrequency                        ARFCN-ValueNR
        OPTIONAL,    -- Cond SSBoxAssociateSSB
    ssbSubcarrierSpacing                SubcarrierSpacing
        OPTIONAL,    -- Cond SSBoxAssociateSSB
    smtc1                               SSB-MTC
        OPTIONAL,    -- Cond SSBoxAssociateSSB
    smtc2                               SSB-MTC2
        OPTIONAL,    -- Cond IntraFreqConnected
    refFreqCSI-RS                       ARFCN-ValueNR
        OPTIONAL,    -- Cond CSI-RS
    referenceSignalConfig               ReferenceSignalConfig,
    absThreshSS-BlocksConsolidation     ThresholdNR
            OPTIONAL,    -- Need R
    absThreshCSI-RS-Consolidation       ThresholdNR
            OPTIONAL,    -- Need R
    nrofSS-BlocksToAverage              INTEGER (2..maxNrofSS-BlocksToAverage)
            OPTIONAL,    -- Need R
    nrofCSI-RS-ResourcesToAverage       INTEGER (2..maxNrofCSI-RS-ResourcesToAverage)
            OPTIONAL,    -- Need R
    quantityConfigIndex                 INTEGER (1..maxNrofQuantityConfig),
    offsetMO                            Q-OffsetRangeList,
    cellsToRemoveList                   PCI-List
            OPTIONAL,    -- Need N
    cellsToAddModList                   CellsToAddModList
            OPTIONAL,    -- Need N
    blackCellsToRemoveList              PCI-RangeIndexList
            OPTIONAL,    -- Need N
    blackCellsToAddModList              SEQUENCE (SZE (1..maxNrofPCI-Ranges)) OF PCI-Range
Element     OPTIONAL,    -- Need N
    whiteCellsToRemoveList              PCI-RangeIndexList
            OPTIONAL,    -- Need N
    whiteCellsToAddModList              SEQUENCE (SIZE (1..maxNrofPCI-Ranges)) OF PCI-Range
Element     OPTIONAL,    -- Need N
    ...,
    [[
    freqBandIndicatorNR                 FreqBandIndicatorNR
            OPTIONAL,    -- Need R
    measCycleSCell                      ENUMERATED {sf160, sf256, sf320, sf512, sf640, sf10
24, sf1280}  OPTIONAL,   -- Need R
    ]]
}
ReferenceSignalConfig::=                SEQUENCE {
    ssb-ConfigMobility                  SSB-ConfigMobility
            OPTIONAL,    -- Need M
    csi-rs-ResourceConfigMobility       SetupRelease { CSI-RS-ResourceConfigMobility }
            OPTIONAL,    -- Need M
}
SSB-ConfigMobility::=                   SEQUENCE {
    ssb-ToMeasure                       SetupRelease { SSB-ToMeasure }
            OPTIONAL,    -- Need M
    deriveSSB-IndexFromCell             BOOLEAN,
    ss-RSSI-Measurement                 SS-RSSI-Measurement
            OPTIONAL,    -- Need M
    ...
}
Q-OffsetRangeList ::=                   SEQUENCE {
    rsrpOffsetSSB                       Q-OffsetRange          DEFAULT dB0,
    rsrqOffsetSSB                       Q-OffsetRange          DEFAULT dB0,
    sinrOffsetSSB                       Q-OffsetRange          DEFAULT dB0,
    rsrpOffsetCSI-RS                    Q-OffsetRange          DEFAULT dB0,
    rsrqOffsetCSI-RS                    Q-OffsetRange          DEFAULT dB0,
    sinrOffsetCSI-RS                    Q-OffsetRange          DEFAULT dB0
}
ThresholdNR ::=                         SEQUENCE {
    thresholdRSRP                       RSRP-Range
            OPTIONAL,    -- Need R
    thresholdRSRQ                       RSRQ-Range
            OPTIONAL,    -- Need R
    thresholdSINR                       SINR-Range
            OPTIONAL,    -- Need R
}
```

```
CellsToAddModList =             SEQUENCE (SIZE (1..maxNrofCellMeas)) OF CellsToAddMod
CellsToAddMod =                 SEQUENCE {
  physCellId                      PhysCellId,
  cellIndividualOffset            Q-OffsetRangeList
}
-- TAG-MEASOBJECTNR-STOP
-- ASN1STOP
```

CellsToAddMod field descriptions cellIndividualOffset
Cell individual offsets applicable to a specific cell.
physCellId
Physical cell identity of a cell in the cell list.

MeasObjectNR field descriptions absThreshCSI-RS-Consolidation
Absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2.
absThreshSS-BlocksConsolidation
Absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2.
blackCellsToAddModList
List of cells to add/modify in the black list of cells. It applies only to SSB resources.
blackCellsToRemoveList
List of cells to remove from the black list of cells.
cellsToAddModList
List of cells to add/modify in the cell list.
cellsToRemoveList
List of cells to remove from the cell list.
freqBandIndicatorNR
The frequency band in which the SSB and/or CSI-RS indicated in this MeasObjectNR are located and according to which the UE shall perform the RRM measurements. This field is always provided when the network configures measurements with this MeasObjectNR.
measCycleSCell
The parameter is used only when an SCell is configured on the frequency indicated by the measObjectNR and is in deactivated state, see TS 38.133 [14]. gNB configures the parameter whenever an SCell is configured on the frequency indicated by the measObjectNR, but the field may also be signalled when an SCell is not configured. Value sf160 corresponds to 160 sub-frames, value sf256 corresponds to 256 sub-frames and so on.
nrofCSI-RS-ResourcesToAverage
Indicates the maximum number of measurement results per beam based on CSI-RS resources to be averaged. The same value applies for each detected cell associated with this MeasObjectNR.
nrofSS-BlocksToAverage
Indicates the maximum number of measurement results per beam based on SS/PBCH blocks to be averaged. The same value applies for each detected cell associated with this MeasObject.
offsetMO
Offset values applicable to all measured cells with reference signal(s) indicated in this MeasObjectNR.
quantityConfigIndex
Indicates the n-th element of quantityConfigNR-List provided in MeasConfig.
referenceSignalConfig
RS configuration for SS/PBCH block and CSI-RS.
refFreqCSI-RS
Point A which is used for mapping of CSI-RS to physical resources according to TS 38.211 [16] clause 7.4.1.5.3.
smtc1
Primary measurement timing configuration. (see clause 5.5.2.10).
smtc2

MeasObjectNR field descriptions (continued)

Secondary measurement timing configuration for SS corresponding to this MeasObjectNR with PCI listed in pci-List. For these SS, the periodicity is indicated by periodicity in smtc2 and the timing offset is equal to the offset indicated in periodicityAndOffset modulo periodicity, periodicity in smtc2 can only be set to a value strictly shorter than the periodicity indicated by periodicityAndOffset in smtc1 (e.g. if periodicityAndOffset indicates sf10, periodicity can only be set of sf5, if periodicityAndOffset indicates sf5, smtc2 cannot be configured).
ssbFrequency
Indicates the frequency of the SS associated to this MeasObjectNR.
ssbSubcarrierSpacing
Subcarrier spacing of SSB. Only the values 15 kHz or 30 kHz (FR1), and 120 kHz or 240 kHz (FR2) are applicable.
white CellsToAddModList
List of cells to add/modify in the white list of cells. It applies only to SSB resources.
whiteCellsToRemoveList
List of cells to remove from the white list of cells.

ReferenceSignalConfig field descriptions csi-rs-ResourceConfigMobility
CSI-RS resources to be used for CSI-RS based RRM measurements.
ssb-ConfigMobility
SSB configuration for mobility (nominal SSBs, timing configuration).

SSB-ConfigMobility field descriptions deriveSSB-IndexFromCell
if this field is set to true, UE assumes SFN and frame boundary alignment across cells on the same frequency carrier as specified in TS 38.133 [14]. Hence, if the UE is configured with a serving cell for which (absoluteFrequencySSB, subcarrierSpacing) in ServingCellConfigCommon is equal to (ssbFrequency, ssbSubcarrierSpacing) in this MeasObjectNR, this field indicates whether the UE can utilize the timing of this serving cell to derive the index of SS block transmitted by neighbour cell. Otherwise, this field indicates whether the UE may use the timing of any detected cell on that target frequency to derive the SSB index of all neighbour cells on that frequency.
ssb-ToMeasure
The set of SS blocks to be measured within the SMTC measurement duration. The first/leftmost bit corresponds to SS/P BCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured (see TS 38.215 [9]). When the field is not configured the UE measures on all SS blocks. Regardlessof the value of this field, SS/PBCH blocks outside of the applicable smtc are not to be measured. See TS 38.215 [9] clause 5.1.1.

| Conditional Presence | Explanation |
|---|---|
| CSI-RS | This field is mandatory present if csi-rs-ResourceConfigMobility is configured, otherwise, it is absent. |

| | |
|---|---|
| SSBorAssociatedSSB | This field is mandatory present if ssb-ConfigMobility is configured or associatedSSB is configured in at least one cell. Otherwise, it is absent, Need R. |
| IntraFreqConnected | This field is optionally present, Need R if the UE is configured with a serving cell for which (absoluteFrequencySSB, subcarrierSpacing) in ServingCellConfigCommon is equal to (ssbFrequency, ssbSubcarrierSpacing) in this MeasObjectNR, otherwise, it is absent. |

When a UE experiences an IDC problem (e.g., an IDC interference problem), or a previously-reported IDC problem is changed, methods below are provided to indicate frequency information in an affectedCarrierFreqCombList field. The affectedCarrierFreqCombList field may be reported when UL Carrier Aggregation is configured for the UE. When an IDC problem due to inter-modulation distortion/harmonics from NR (or LTE) system occurs in a particular frequency or frequency band, information of the frequency or frequency band related to the IDC problem is included in affectCarrierFreqwCombList. The frequency band refers to a certain section of a frequency which is defined by the NR standard. Even when measurement-related configuration is not arranged, a UL Carrier Aggregation combination supported by the UE may be included in affectedCarrierFreqCombList.

Option 2-1: Center frequency information of a frequency or a frequency band which has an IDC problem is indicated by using ARFCN-ValueNR IE and/or a combination of ARFCN-ValueNR. A bandwidth of the frequency having the IDC problem, which is indicated by a center frequency, is previously determined according to a preset rule. For example, the bandwidth is preset in a measConfig field from a network or a pre-fixed value such as 100 MHz is applied thereto. Alternatively, when a frequency band or a center frequency of the frequency band supported by a particular cell belongs to affectedCarrierFreqCombList, it may be determined that the frequency band supported by the particular cell has an IDC problem.

Option 2-2: Information of a frequency having an IDC problem is indicated by using MeasObjectId IE and/or a combination of MeasObjectId.

Option 2-3: Information of a frequency band having an IDC problem is indicated by using FreqBandIndicatorNR or MultiFrequencyBandListNR. When two or more frequency bands have an IDC problem, MulitFrequencyBandListNR IE is used. MultiFregencyBandListNR corresponds to a combination of FreqBandIndicatorNRs, and Abstract Syntax Notation One (ASN.1) corresponding thereto is as below. However, the disclosure is not limited thereto.

MultiFrequencyBandListNR
The IE MultiFrequencyBandListNR is used to configure a list of one or multiple NR frequency bands.

| MultiFrequencyBandListNR information element |
|---|
| -- ASN1START<br>-- TAG-MULTIFREQUENCYBANDLISTNR-START<br>MultiFrequencyBandListNR ::=    SEQUENCE (SIZE (1..maxNrofMultiBands)) OF FreqBandIndicatorNR<br>-- TAG-MULTIFREQUENCYBANDLISTNR-STOP<br>-- ASN1STOP |

Option 2-4: Center frequency information of a frequency or a frequency band having an IDC problem from among frequencies in CandidateServingFreqList is indicated by using ARFCN-ValueNR IE and/or a combination of ARFCN-ValueNR.

Option 2-5: Whether to perform reporting by using ARFCN-ValueNR IE and/or a combination of ARFCN-ValueNR or MeasObjectId IE and/or a combination of MeasObjectId is configured in IE idc-AssistanceConfig. According to the configurations, the UE indicates center frequency information of a frequency or a frequency band having an IDC problem.

However, the disclosure is not limited thereto, and Option 2-1 to Option 2-5 may be combined together to be performed.

The UE may have been previously reported an IDC problem, and may not experience the IDC problem anymore. Accordingly, it is required for the UE to indicate, to a BS, that the IDC problem previously reported to the BS does not exist anymore. In this regard, the UE may indicate that the IDC problem does not exist anymore, by using one of methods below.

Option 3-1: An indicator indicating that an IDC problem does not exist is included in idc-Assistance field. In this regard affectedCarrierFreqList and affectedCarrierFreqCombList fields may not be included in the idc-Assistance field.

Option 3-2: idc-Assistance field does not include any information. That is, any field may not be included therein (empty IDC-Assistance IE).

Option 3-3: idc-Assistance has a SetupRelease {idc-Assistance}format in ASN. 1 format. When an IDC problem does not exist, Release is indicated in the format.

However, the disclosure is not limited thereto, and Option 3-1 to Option 3-3 may be combined together to be performed.

In response to idc-AssistanceConfig IE being received, the gNB 1e-10 may perform reconfiguration to remove the IDC problem, based on the IDC information reported by the UE 1e-05 (operation 1e-40). In this regard, whether to actually perform reconfiguration, and reconfigured parameter setting values are determined according to implementation of the gNB 1e-10.

Reconfiguration information is provided to the UE 1e-05 via RRCReconfiguration that is one RRC message (operation 1e-45).

Also, according to an embodiment of the disclosure, Option 1-1 to Option 3-3 may be combined together to be performed.

Figure 1F:
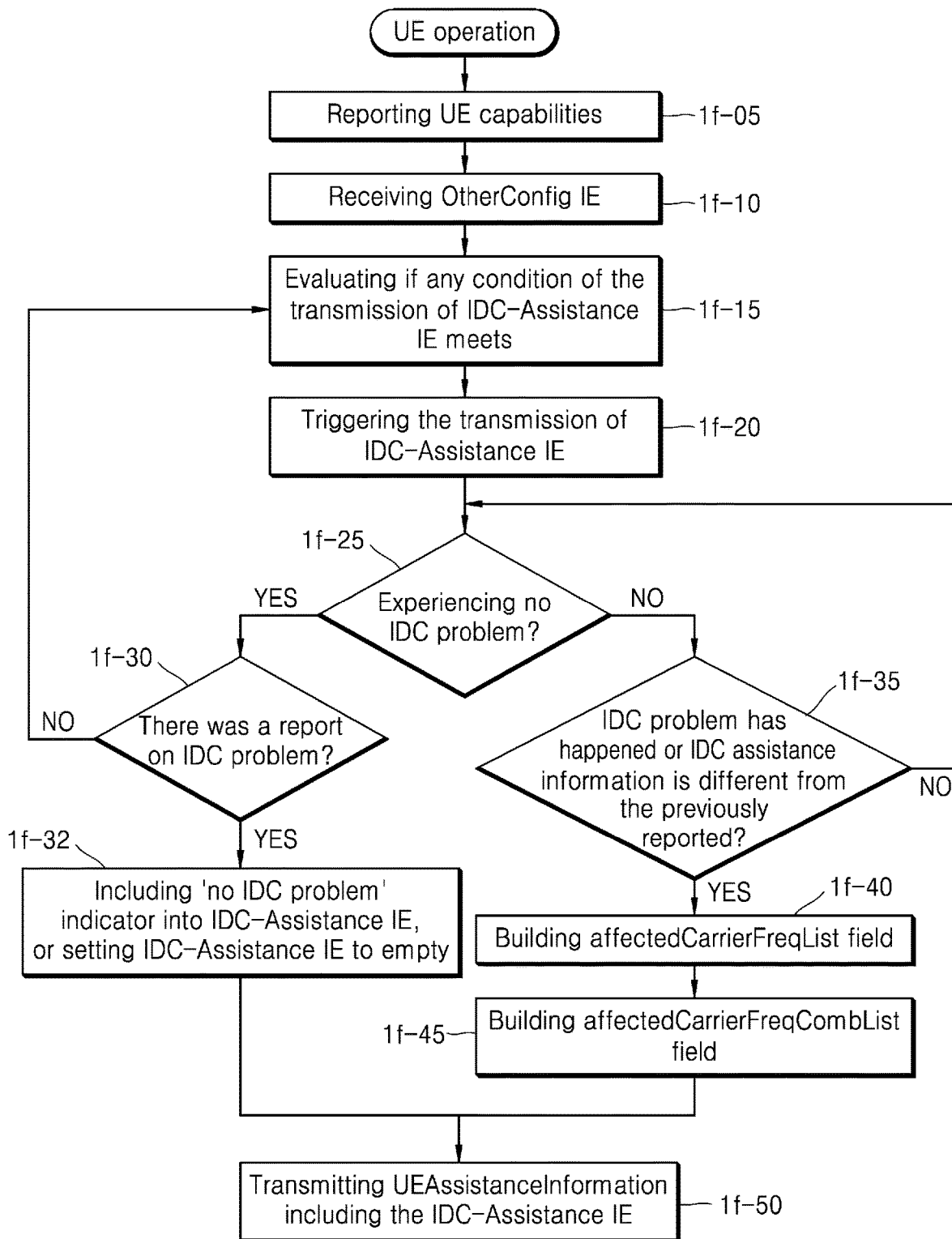
FIG. 1F is a flowchart of operations by a UE, according to an embodiment of the disclosure.

FIG. 1F is a flowchart of operations by a UE, according to an embodiment of the disclosure.

Referring to FIG. 1F, in operation 1f-05, the UE may report, to a BS, that the UE has a capability of reporting IDC information.

In operation 1f-10, the UE receives an RRCReconfiguration message from the BS. The RRCReconfiguration message includes OtherConfig IE including idc-AssistanceConfig IE. The BS uses IE idc-AssistanceConfig to configure that the UE can report preset information to the BS.

In operation 1f-15, the UE determines (or evaluates) whether a condition for transmission of UEAssistanceInformation message including preset IDC information is satisfied.

In operation 1f-20, when the condition for transmission of UEAssistanceInformation message is satisfied, the UE triggers transmission of IDC-Assistance IE.

In operation 1f-25, the UE determines whether the UE currently experiences an IDC problem.

In operation 1*f*-30, when the UE does not currently experience the IDC problem, the UE determines whether the UE previously reported the IDC problem.

In operation 1*f*-32, the UE configures IDC-Assistance IE to indicate that the UE has experienced the IDC problem and does not experience the IDC problem anymore. A method of configuring the IDC-Assistance IE may be decided according to one of the options provided above or a combination thereof.

In operation 1*f*-35, when the UE experiences the IDC problem, the UE may determine whether an IDC problem newly occurs or previously-reported IDC information is changed.

If so, in operation 1*f*-40, the UE configures (or builds) affectedCarrierFreqList according to one of the options provided above or a combination thereof, and adds affectedCarrierFreqList to IDC-Assistance IE.

In operation 1*f*-45, the UE configures (or builds) affectedCarrierFreqCombList according to one of the options provided above or a combination thereof, and adds affectedCarrierFreqCombList to IDC-Assistance IE.

In operation 1*f*-50, the UE transmits a UEAssistanceInformation message including the information configured in operation described above.

Also, according to an embodiment of the disclosure, a method by which a UE provides IDC information may be performed as below. The UE may transmit IDC information reporting capability information to a BS, may receive configuration information about IDC information reporting from the BS, may determine whether IDC interference has occurred, generates IDC-Assistance information including preset IDC information, according to a result of the determination, and may transmit the generated IDC-Assistance information.

Also, according to an embodiment of the disclosure, the UE may determine whether a condition for transmission of IDC-Assistance information is satisfied, and depending on a result of the determination, the UE may determine whether IDC interference has occurred. Also, the UE may generate IDC-Assistance information, based on whether IDC interference previously occurred, whether an IDC problem was previously reported, or whether current IDC interference is different from pre-occurred IDC interference. An IDC-Assistance generating method or a configuration of at least one of affectedCarrierFreqList or affectedCarrierFreqCombList which are to be included in IDC-Assistance may be performed by one of Option 1-1 to Option 3-3 or a combination thereof.

Figure 1G:
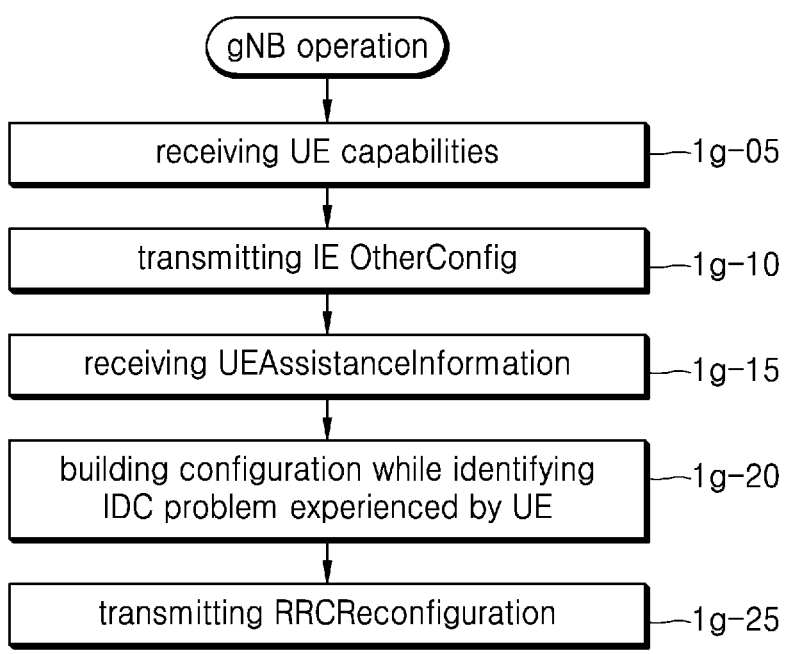
FIG. 1G is a flowchart of operations by a BS, according to an embodiment of the disclosure.

FIG. 1G is a flowchart of operations by a BS, according to an embodiment of the disclosure.

Referring to FIG. 1G, in operation 1*g*-05, the BS receives UE capability information from a UE.

In operation 1*g*-10, the BS transmits, to the UE, IE otherConfig including an idc-AssistanceConfig field.

In operation 1*g*-15, the BS receives a UEAssistanceInformation message from the UE. The UEAssistanceInformation message may include an IDC-Assistance field.

In operation 1*g*-20, the BS configures (or builds) configuration parameters based on information received via the UEAssistanceInformation message.

In operation 1*g*-25, the BS adds configuration information to an RRCReconfiguration message and transmits the RRCReconfiguration message to the UE.

Figure 1H:
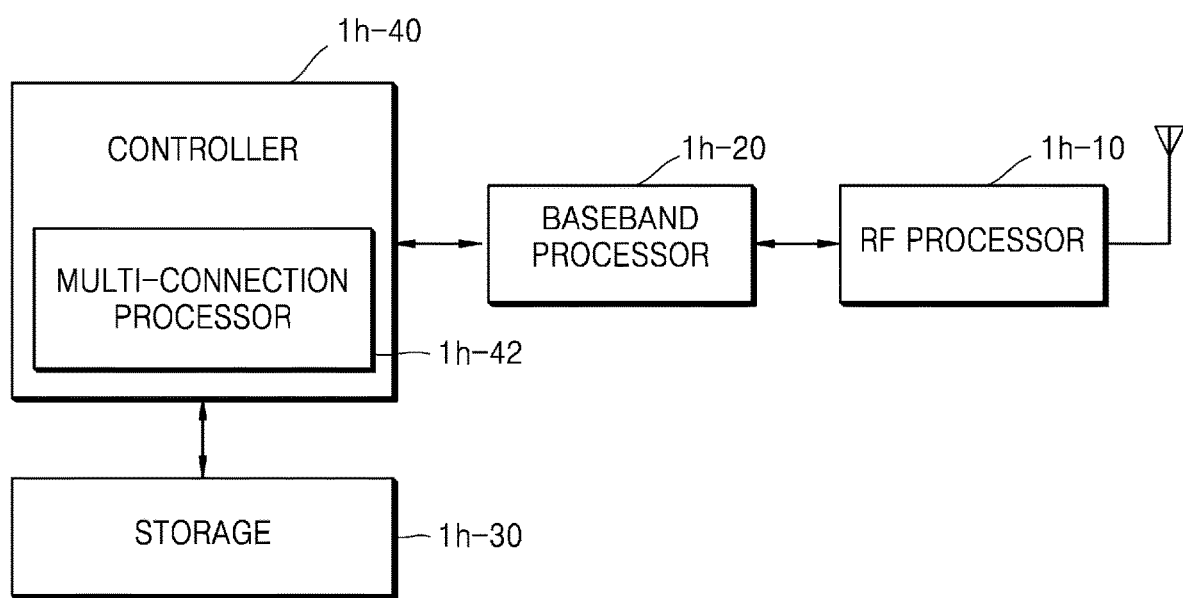
FIG. 1H is a block diagram illustrating an inner structure of a UE, according to an embodiment of the disclosure.

FIG. 1H is a block diagram illustrating an inner structure of a UE, according to an embodiment of the disclosure.

Referring to FIG. 1H, the UE may include a radio frequency (RF) processor 1*h*-10, a baseband processor 1*h*-20, a storage 1*h*-30, and a controller 1*h*-40. However, the configuration of the UE is not limited to the example, and the UE may include fewer elements or more elements than the elements illustrated in FIG. 1H.

The RF processor 1*h*-10 performs functions for transmitting and receiving signals through radio channels, e.g., band conversion and amplification of the signals. That is, the RF processor 1*h*-10 may up-convert a baseband signal provided from the baseband processor 1*h*-20, into an RF band signal and then may transmit the RF band signal through an antenna, and may down-convert an RF band signal received through the antenna, into a baseband signal. For example, the RF processor 1*h*-10 may include a transmit filter, a receive filter, an amplifier, a mixer, an oscillator, a digital-to-analog convertor (DAC), an analog-to-digital convertor (ADC), or the like. However, the disclosure is not limited thereto. Although only one antenna is illustrated in FIG. 1H, the UE may include a plurality of antennas. The RF processor 1*h*-10 may include a plurality of RF chains. The RF processor 1*h*-10 may perform beamforming. For beamforming, the RF processor 1*h*-10 may adjust phases and intensities of signals to be transmitted or received via a plurality of antennas or antenna elements. Also, the RF processor 1*h*-10 may perform a MIMO operation and may receive a plurality of layers in the MIMO operation.

The baseband processor 1*h*-20 may convert between a baseband signal and a bit string based on physical entity specifications of a system. For example, for data transmission, the baseband processor 1*h*-20 may generate complex symbols by encoding and modulating a transmit bit string. For data reception, the baseband processor 1*h*-20 may reconstruct a received bit string by demodulating and decoding a baseband signal provided from the RF processor 1*h*-10. For example, according to an OFDM scheme, for data transmission, the baseband processor 1*h*-20 may generate complex symbols by encoding and modulating a transmit bit string, may map the complex symbols to subcarriers, and then may configure OFDM symbols by performing inverse fast Fourier transform (IFFT) and cyclic prefix (CP) insertion. For data reception, the baseband processor 1*h*-20 may segment a baseband signal provided from the RF processor 1*h*-10, into OFDM symbol units, may reconstruct signals mapped to subcarriers by performing fast Fourier transform (FFT), and then may reconstruct a received bit string by demodulating and decoding the signals.

The baseband processor 1*h*-20 and the RF processor 1*h*-10 transmit and receive signals as described above. Accordingly, the baseband processor 1*h*-20 and the RF processor 1*h*-10 may also be called a transmitter, a receiver, a transceiver, or a communicator. At least one of the baseband processor 1*h*-20 or the RF processor 1*h*-10 may include a plurality of communication modules to support a plurality of different radio access technologies. At least one of the baseband processor 1*h*-20 or the RF processor 1*h*-10 may include different communication modules to process signals of different frequency bands. For example, the different radio access technologies may include a wireless local area network (WLAN) (e.g., IEEE 802.11), a cellular network (e.g., LTE), or the like. The different frequency bands may include a super-high frequency (SHF) (e.g., 2.NRHz, NRhz) band and a millimeter wave (mmWave) (e.g., 60 GHz) band. The UE may transmit and receive signals to and from the BS by using the baseband processor 1*h*-20 and the RF processor 1*h*-10, and the signals may include control information and data.

The storage 1*h*-30 may store basic programs, application programs, and data, e.g., configuration information, for operations of the UE. In particular, the storage 1h-30 may store information related to a second access node that performs wireless communication by using a second radio access technology. The storage 1h-30 provides the stored data upon request by the controller 1h-40. The storage 1h-30 may include any or a combination of storage media such as read-only memory (ROM), random access memory (RAM), a hard disk, a compact disc (CD)-ROM, and a digital versatile disc (DVD). Also, the storage 1h-30 may include a plurality of memories. According to an embodiment of the disclosure, the storage 1h-30 may store a program for performing a method of providing IDC information according to the disclosure.

The controller 1h-40 controls overall operations of the UE. For example, the controller 1h-40 transmits or receives signals through the baseband processor 1h-20 and the RF processor 1h-10. Also, the controller 1h-40 may record and read data on or from the storage 1h-30. To this end, the controller 1h-40 may include at least one processor. For example, the controller 1h-40 may include a communication processor (CP) for controlling communications and an application processor (AP) for controlling a higher layer such as an application program. According to an embodiment of the disclosure, the controller 1h-40 may include a multi-connection processor 1h-42 configured to process processes of a multi-connection mode. At least one element in the UE may be implemented as a chip.

Figure 1I:
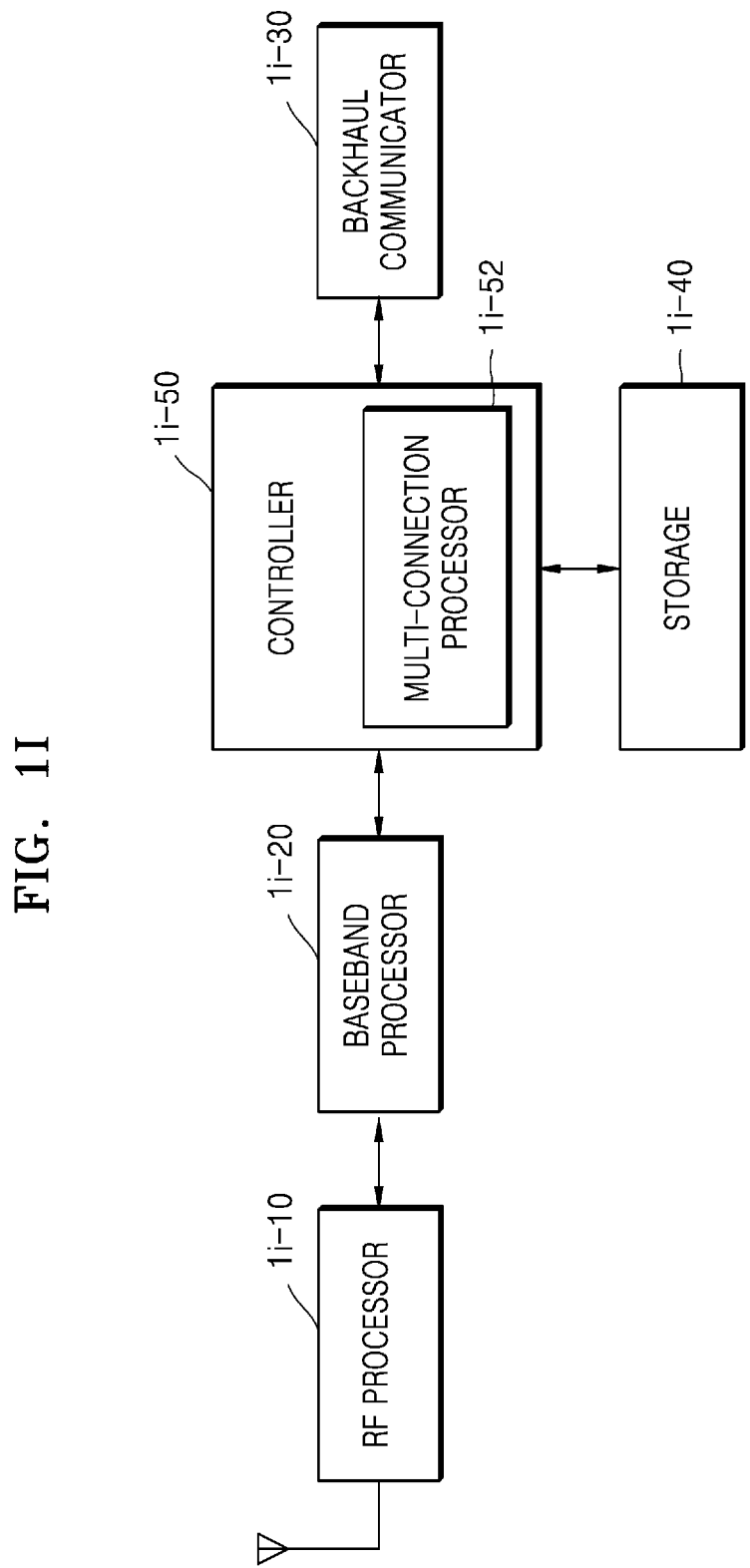
FIG. 1I is a block diagram illustrating a configuration of a BS, according to an embodiment of the disclosure.

FIG. 1I is a block diagram illustrating a configuration of a BS, according to an embodiment of the disclosure.

Referring to FIG. 1I, the BS may include an RF processor 1i-10, a baseband processor 1i-20, a backhaul communicator 1i-30, a storage 1i-40, and a controller 1i-50. However, the BS is not limited thereto and may include fewer elements or more elements than the elements illustrated in FIG. 1I. The RF processor 1i-10 may perform functions for transmitting and receiving signals via radio channels, e.g., band conversion and amplification of the signals. That is, the RF processor 1i-10 may up-convert a baseband signal provided from the baseband processor 1i-20, into an RF band signal and then may transmit the RF band signal through an antenna, and may down-convert an RF band signal received through an antenna, into a baseband signal. For example, the RF processor 1i-10 may include a transmit filter, a receive filter, an amplifier, a mixer, an oscillator, a DAC, an ADC, or the like. Although only one antenna is illustrated in FIG. 1I, the RF processor 1i-10 may include a plurality of antennas. Also, the RF processor 1i-10 may include a plurality of RF chains. In addition, the RF processor 1i-10 may perform beamforming. For beamforming, the RF processor 1i-10 may adjust phases and intensities of signals to be transmitted or received through a plurality of antennas or antenna elements. The RF processor 1i-10 may perform a DL MIMO operation by transmitting one or more layers.

The baseband processor 1i-20 may perform conversion between a baseband signal and a bit string based on physical layer specifications of a first radio access technology. For example, for data transmission, the baseband processor 1i-20 may generate complex symbols by encoding and modulating a transmit bit string. For data reception, the baseband processor 1i-20 may reconstruct a received bit string by demodulating and decoding a baseband signal provided from the RF processor 1i-10. For example, according to an OFDM scheme, for data transmission, the baseband processor 1i-20 may generate complex symbols by encoding and modulating a transmit bit string, may map the complex symbols to subcarriers, and then may configure OFDM symbols by performing IFFT and inserting a CP. For data reception, the baseband processor 1i-20 may segment a baseband signal provided from the RF processor 1i-10, into OFDM symbol units, may reconstruct signals mapped to subcarriers by performing FFT, and then may reconstruct a received bit string by demodulating and decoding the signals. The baseband processor 1i-20 and the RF processor 1i-10 may transmit and receive signals as described above. Accordingly, the baseband processor 1i-20 and the RF processor 1i-10 may also be called a transmitter, a receiver, a transceiver, a communicator, or a wireless communicator. The BS may transmit and receive signals to and from the UE by using the baseband processor 1i-20 and the RF processor 1i-10, and the signals may include control information and data.

The backhaul communicator 1i-30 may provide an interface for communicating with other nodes in a network. That is, the backhaul communicator 1i-30 may convert a bit string to be transmitted from a primary BS to another node, e.g., a secondary BS or a core network, into a physical signal, and may convert a physical signal received from the other node, into a bit string.

The storage 1i-40 may store basic programs, application programs, and data, e.g., configuration information, for operations of the BS. In particular, the storage 1i-40 may store, for example, information about bearers assigned for a connected UE and measurement results reported from the connected UE. Also, the storage 1i-40 may store criteria information used to determine whether to provide or release multi-connection to or from the UE. The storage 1i-40 provides the stored data upon request by the controller 1i-50. The storage 1i-40 may include any or a combination of storage media such as ROM, RAM, a hard disk, a CD-ROM, and a DVD. Also, the storage 1i-40 may include a plurality of memories. According to an embodiment of the disclosure, the storage 1i-40 may store a program for executing a method of receiving IDC information from the UE and configuring a parameter.

The controller 1i-50 controls overall operations of the BS. For example, the controller 1i-50 transmits and receives signals through the baseband processor 1i-20 and the RF processor 1i-10, or the backhaul communicator 1i-30. The controller 1i-50 records or reads data on or from the storage 1i-40. To this end, the controller 1i-50 may include at least one processor. According to an embodiment of the disclosure, the controller 1i-50 may include a multi-connection processor 1i-52 configured to process processes of a multi-connection mode.

The methods, according to the embodiments of the disclosure as described herein or in the following claims, may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions causing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access an apparatus that performs embodiments of the disclosure.

According to embodiments of the disclosure, provided are an apparatus and method for effectively providing a service in a mobile communication system.

In the afore-described embodiments of the disclosure, an element or elements included in the disclosure are expressed in a singular or plural form depending on the described embodiments of the disclosure. However, the singular or plural form is selected appropriately for a situation assumed for convenience of descriptions, the disclosure is not limited to the singular or plural form, and an element expressed in a singular form may include a plurality of elements and elements expressed in a plural form may include a single element.

While the disclosure has been shown and described with reference to various embodiments thereof, it will be understood by those skilled in the art that various changes in form and details may be made therein without departing from the spirit and scope of the disclosure as defined by the appended claims and their equivalents. Also, the embodiments of the disclosure may be combined with each other as required. For example, portions of the methods provided by the disclosure may be combined with each other to enable the BS and the UE to operate. Also, although the embodiments of the disclosure are described based on 5G and NR systems, modifications based on the technical scope of the embodiments of the disclosure may be applied to other communication systems such as LTE, LTE-A, LTE-A-Pro systems, or the like.

What is claimed is:

1. A method, performed by a user equipment (UE), comprising:
   transmitting, to a base station (BS), capability information related to in-device coexistence (IDC) reporting;
   receiving, from the BS, configuration information related to IDC reporting;
   identifying an IDC problem; and
   in response to identifying the IDC problem, transmitting, to the BS, a radio resource control (RRC) message including frequency information associated with the IDC problem, based on the configuration information related to IDC reporting,
   wherein the frequency information associated with the IDC problem is at least one of combinations of frequencies associated with the IDC problem when carrier aggregation is configured, and
   wherein the at least one of combinations of frequencies associated with the IDC problem is indicated by using absolute radio-frequency channel number (ARFCN)-value new radio (NR).

2. The method of claim 1, further comprising:
   identifying that the IDC problem is not experienced; and
   transmitting, to the BS, the RRC message without the frequency information associated with the IDC problem, based on not experiencing the IDC problem.

3. A method, performed by a base station (BS), comprising:
   receiving, from a user equipment (UE), capability information related to in-device coexistence (IDC) reporting;
   transmitting, to the UE, configuration information related to IDC reporting; and
   receiving, from the UE, a radio resource control (RRC) message including frequency information associated with an IDC problem,
   wherein the frequency information associated with the IDC problem is at least one of combinations of frequencies associated with the IDC problem when carrier aggregation is configured, and
   wherein the at least one of combinations of frequencies associated with the IDC problem is indicated by using absolute radio-frequency channel number (ARFCN)-value new radio (NR).

4. The method of claim 3, further comprising:
   receiving, from the UE, the RRC message without the frequency information associated with the IDC problem.

5. A user equipment (UE) comprising:
   a transceiver; and
   a processor coupled with the transceiver and configured to:
     transmit, to a base station (BS), capability information related to in-device coexistence (IDC) reporting,
     receive, from the BS, configuration information related to IDC reporting,
     identify an IDC problem, and
     in response to identifying the IDC problem, transmit, to the BS, a radio resource control (RRC) message including frequency information associated with the IDC problem, based on the configuration information related to the IDC reporting,
   wherein the frequency information associated with the IDC problem is at least one of combinations of frequencies associated with the IDC problem when carrier aggregation is configured, and
   wherein the at least one of combinations of frequencies associated with the IDC problem is indicated by using absolute radio-frequency channel number (ARFCN)-value new radio (NR).

6. The UE of claim 5, wherein the processor is further configured to:
   identify that the IDC problem is not experienced, and
   transmit, to the BS, the RRC message without the frequency information associated with the IDC problem, based on not experiencing the IDC problem.

7. A base station (BS) comprising:
   a transceiver; and
   a processor coupled with the transceiver and configured to:
     receive, from a user equipment (UE), capability information related to in-device coexistence (IDC) reporting,
     transmit, to the UE, configuration information related to IDC reporting, and
     receive, from the UE, a radio resource control (RRC) message including frequency information associated with an IDC problem,
   wherein the frequency information associated with the IDC problem is at least one of combinations of frequencies associated with the IDC problem when carrier aggregation is configured, and wherein the at least one of combinations of frequencies associated with the IDC problem is indicated by using absolute radio-frequency channel number (ARFCN)-value new radio (NR).

8. The BS of claim 7, wherein the processor is further configured to:
receive, from the UE, the RRC message without the frequency information associated with the IDC problem.

* * * * *